United States Patent [19]

Belk

[11] 4,376,409

[45] Mar. 15, 1983

[54] CITRUS FRUIT JUICE EXTRACTOR

[75] Inventor: Wilber C. Belk, Lakeland, Fla.

[73] Assignee: FMC Corporation, Chicago, Ill.

[21] Appl. No.: 177,029

[22] Filed: Aug. 11, 1980

[51] Int. Cl.³ .......................... A23N 1/02; B30B 9/02
[52] U.S. Cl. .................................. 99/509; 100/98 R;
100/108; 100/213
[58] Field of Search ................. 99/495, 509, 510, 513;
100/37, 98 R, 108, 104, 213, 117, 127

[56] References Cited

U.S. PATENT DOCUMENTS

| 2,960,926 | 11/1960 | McKee | 100/117 |
| 3,736,865 | 6/1973 | Hait | 100/98 R |
| 4,150,617 | 4/1979 | Schramm et al. | 100/117 |

Primary Examiner—Philip R. Coe
Assistant Examiner—Timothy F. Simone
Attorney, Agent, or Firm—Louis J. Pizzanelli; Richard B. Megley

[57] ABSTRACT

An improved citrus fruit juice extractor of the type that includes interdigitating fruit cups which progressively compress a fruit as they are brought together to force juice-bearing material out of the peel of the fruit incorporates a strainer tube that has apertures of differing sizes. The apertures that are spaced from the cups are larger than those apertures that are closest to the cups. The larger apertures in the strainer tube permit substantially whole, ruptured juice sacs to be exuded therethrough at the outset of a juicing cycle without substantially comminuting the juice sacs, and the smaller apertures prevent undesirable material, such as membranes or embryonic seeds, from being forced therethrough under the higher pressures induced at the end of a juicing cycle.

1 Claim, 3 Drawing Figures

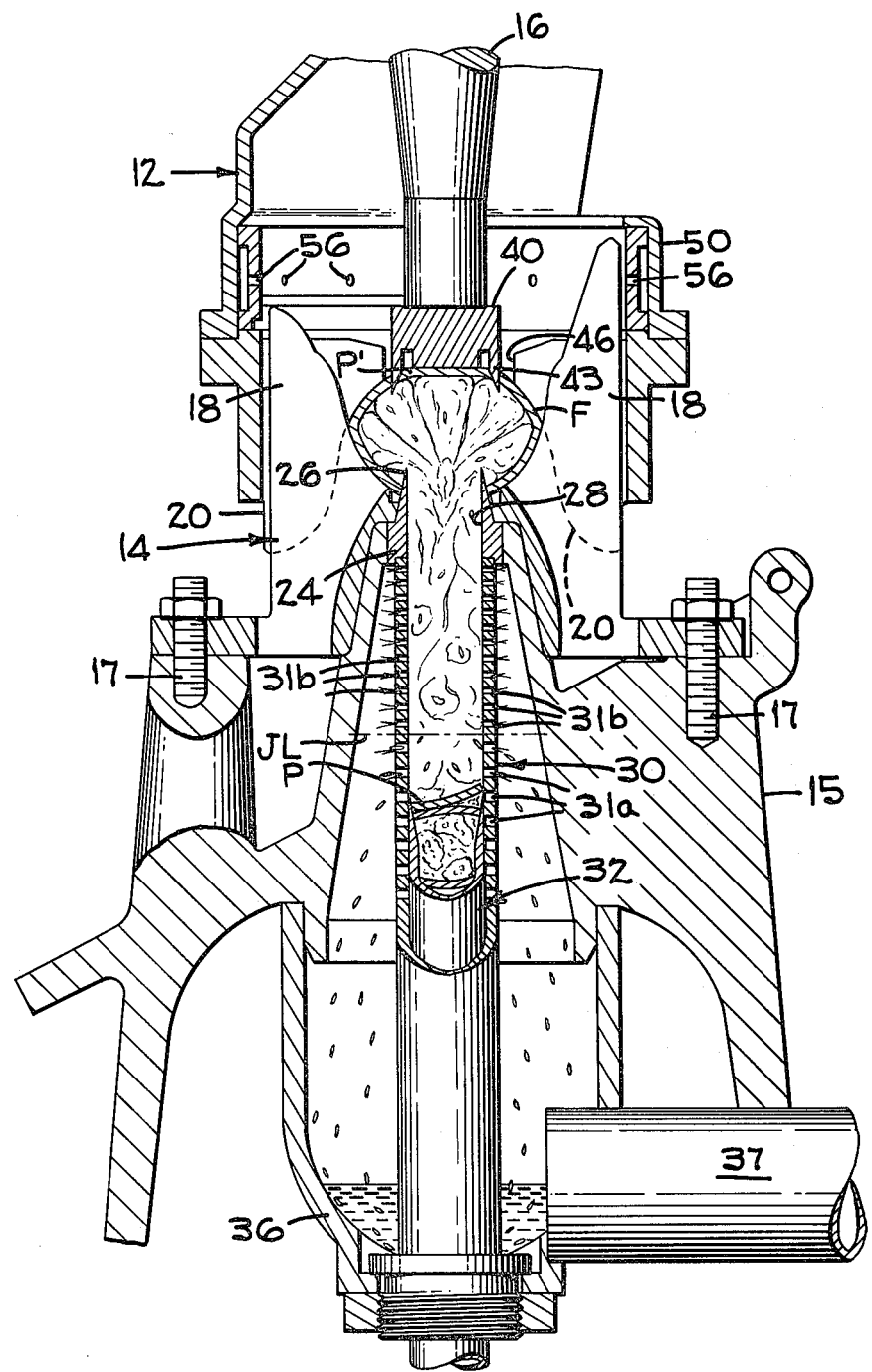
FIG_1

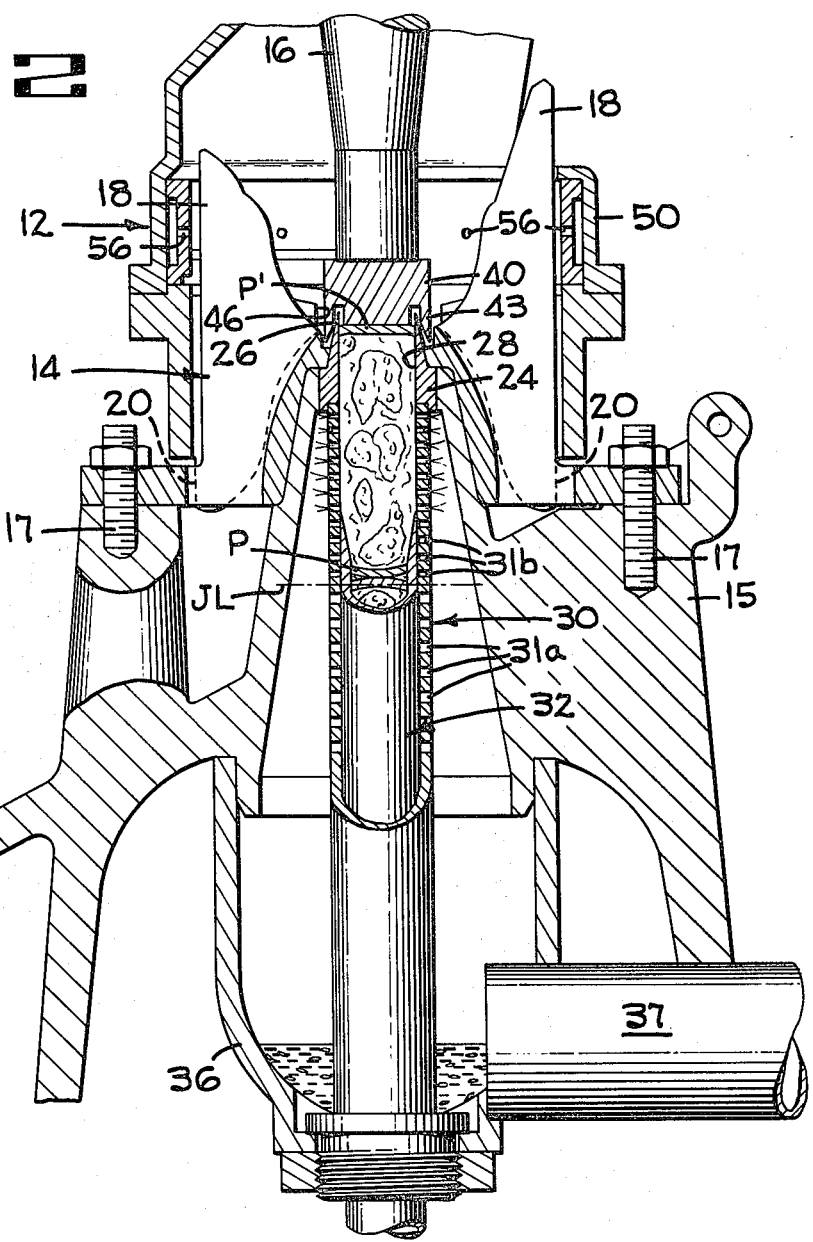
FIG_2
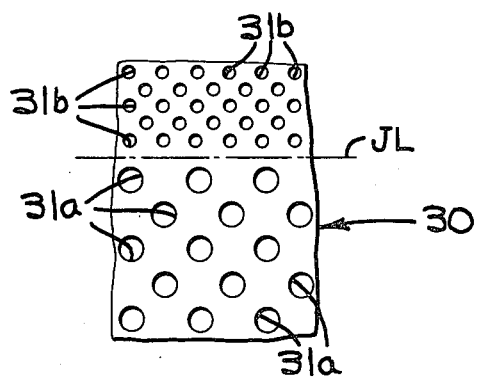
FIG_3

CITRUS FRUIT JUICE EXTRACTOR

BACKGROUND OF THE INVENTION

1. Field of the Invention

The present invention relates to fruit processing equipment and more particularly concerns an improved citrus fruit juice extractor.

2. Description of the Prior Art

The complete commercial processing of citrus fruit to obtain the juice therefrom today includes the dejuicing and discharging of the pulp and internal membranes of the fruit, the breaking up and ejecting of the peel, the extracting and collecting of the peel oil, and the separate extracting and collecting of the fruit juice. All of the above operations can be performed by the apparatus disclosed in U.S. Pat. No. 2,649,730 to J. M. Hait and U.S. Pat. No. 2,780,988 to W. C. Belk et al.

In the apparatus disclosed in the aforesaid Hait and Belk et al patents, a whole unpeeled citrus fruit, for example, an orange, is placed between two opposed cups, each cup being formed by a plurality of circumferentially spaced fingers and one cup having a small exit passage for the juice. The two cups are moved together so that the fingers, which are arranged in a circumferentially offset, interdigitating relationship, progressively contract the cavity in which the fruit is placed to thereby squeeze the juice from the fruit. Near the end of each juicing cycle, the peel is shredded and ejected through an annular opening adjacent the upper central portion of the upper cup.

More particularly, each lower cup of the prior art juice extractor has an aperture formed centrally therein and a tubular knife is fitted tightly within such aperture. The knife has an annular blade that extends upwardly beyond the aperture into the cavity of the lower cup. The tubular knife is supported on the upper end of a strainer tube which forms a part of the juice separating system of the extractor. A juice collecting sump is positioned around the strainer tube to collect juice forced through the apertures in the strainer tube. An orifice tube is slidably received in the strainer tube, and it is driven in timed relationship with the upper cup. Thus, in operation, the upper cup moves downwardly into interdigitation with the lower cup, thereby squeezing the citrus fruit on all sides and pressing it against the annular knife blade, which, in turn, cuts a plug out of the peel of the fruit. As the citrus fruit is further compressed by the interdigitating cups, juice, seeds and pulp of the fruit are forced downwardly into the strainer tube, the lower end of which is blocked by the orifice tube whose axial passage is, in turn, closed by solid extraction residues of previously processed fruit. As the juice-bearing internal material of the fruit is pressed into the strainer tube by the squeezing action, the orifice tube is driven upwardly to thereby reduce the effective volume of the strainer tube and force the juice out through the perforations in the strainer tube into the collecting sump. Subsequently, the upper cup and the orifice tube are retracted to their initial positions so that another fruit may be fed to the lower cup.

Recently, citrus fruit processors have attempted to use the interdigitating cup type of citrus juice extractor to produce a juice product having more substantially whole juice sacs therein to provide the juice with additional bulk.

SUMMARY OF THE INVENTION

The present invention provides an improved citrus fruit juice extractor which is capable of producing a juice product having a relatively large volume of substantially whole juice sacs therein, but yet having a relatively insignificant amount of undesirable material such as pieces of membranes and embryonic seed material therein. According to the present invention, the strainer tube of a citrus fruit juice extractor of the interdigitating cup type is provided with relatively large apertures at the lower end thereof that is farthest from the fruit to be juiced and relatively small apertures at its upper end that is adjacent the fruit. The larger apertures permit substantially whole juice sacs to be forced therethrough at the outset of the juice separation cycle, while the smaller apertures at the upper end of the strainer tube prevent the undesirable material from being forced therethrough later in the juice separation cycle.

Thus, the strainer tube structure of the present invention takes advantage of the reduced pressure at the outset of the juice separation cycle to permit juice sacs to be gently exuded through the larger openings; and, on the other hand, the present invention takes into account the higher pressure occurring later in the juice separation cycle by providing smaller openings at the upper end of the strainer tube which prevent undesirable material from being forced therethrough under the influence of such higher pressure.

BRIEF DESCRIPTION OF THE DRAWINGS

FIG. 1 is a somewhat diagrammatic, fragmentary vertical section of the improved citrus fruit juice extractor of the present invention, wherein the juice and juice sacs are being forced through the larger apertures in the lower end of the strainer tube.

FIG. 2 is a similar fragmentary vertical section with the elements of the juice extractor disposed at an advanced point in time in the juice-extracting operation relative to that shown in FIG. 1, wherein juice is being forced through the smaller apertures in the upper end of the strainer tube.

FIG. 3 is an enlarged fragmentary developed view that illustrates a portion of the strainer tube at the juncture between the larger and smaller apertures therein.

DESCRIPTION OF THE PREFERRED EMBODIMENT

The present invention constitutes an improvement in the juice separation system for a citrus fruit juice extractor of the type described in the aforementioned U.S. Pat. No. 2,649,730 to Hait and U.S. Pat. No. 2,780,988 to W. C. Belk et al. Complete details of the basic machine and the manner in which the various components thereof cooperate may be found in these patents, and such prior art patents are specifically incorporated herein by reference.

With particular reference to FIG. 1, the structure of the juice extractor which encompasses the present invention will be very briefly described. Such machine will be seen to include an upper cup assembly 12, a lower cup assembly 14 and a bedplate 15. The lower cup assembly 14 is stationarily mounted by bolts 17 to the bedplate, and the upper cup assembly 12 is affixed to the lower end of a vertical drive rod 16. The drive rod is reciprocated to first drive the upper cup assembly downwardly into interdigitating engagement with the lower cup assembly to squeeze the citrus fruit F, such as an orange, therebetween and thus extract the juice therefrom; and thereafter the upper cup assembly is driven upwardly to a position well above the lower cup assembly to permit another fruit to be fed into the lower cup assembly. The upper end of the lower cup assembly is provided with a plurality of equiangularly spaced, upstanding fingers 18, and the upper cup assembly is similarly provided with an equiangularly spaced set of downwardly depending fingers 20. These fingers are arranged in a circumferentially offset, interdigitating relationship so that when the cup assemblies are brought together (as shown in FIGS. 1 and 2), the lower ends of the upper fingers 20 are received in the spaces between the upper ends of the lower fingers 18 to form a generally spherical cavity or pocket therebetween. This pocket is then progressively shrunk in size as the two cup assemblies are moved together, as will be hereinafter described.

The lower cup assembly 14 includes a lower cutter assembly which includes an annular cutting knife 24 which includes an annular blade 26 that cuts a small cylindrical plug P out of the ring of the citrus fruit at the very bottom portion thereof (FIG. 1). The annular knife 24 is secured to a strainer tube 30, and the tubular inner passage 28 of the knife 24 communicates with the downwardly depending strainer tube. Mounted within the lower end of the strainer tube is a vertically reciprocating orifice tube 32 which is reciprocated in timed relationship with the reciprocating movement of the upper cup assembly 12. As the orifice tube moves upwardly, the internal portions of the citrus fruit, which are forced into the strainer tube 30 by the compressing force of the cup assemblies on the fruit will be placed under a progressively increasing compressive force to extract the juice and some juice sacs (as discussed hereinafter) outwardly through apertures 31a and 31b in the strainer tube. The separated and strained juice and ruptured juice sacs directed to a collecting sump 36 at the lower end of the lower cup assembly, and the juice is pumped from the sump through a conduit 37 for further processing.

The upper cup assembly 12 includes an annular cutter head 40 which includes an annular blade 43 at the lower end thereof which is adapted to pierce a small cylindrical plug P' of the rind of the fruit at the upper end thereof. The blade 43 is adapted to be received in telescoping engagement with the lower blade 26 when the two cup assemblies 12 and 14 are brought into engagement (FIG. 2). When the cup assemblies are brought together and compressive forces are exerted about the entire spherical surface of the fruit F, the rind of the fruit will be ejected through a narrow annular passageway 46 at the inner edges of the upper fingers 20 and surrounding the upper cutter head 40. As a peel is thus ejected through the upper assembly, a water spray emanates from a plurality of holes 56 in an annular spray ring 50 to wash the peel oil from the peel and to entrain peel oil which has been ejected into the air.

The present invention relates to the apertures 31a and 31b that are formed in the strainer tube 30 for separating core material, membrane material and embryonic seeds from the juice while permitting substantially whole juice sacs juice to flow with the juice through the strainer tube. As shown in FIGS. 1-3, the apertures 31a at the lower end of the perforated portion of the strainer tube below a juncture line JL are larger than the apertures 31b at the upper end of the strainer tube. That is to say, the apertures 31a below the juncture line JL are considerably larger in diameter than the apertures 31b thereabove. In particular, the larger apertures 31a are large enough to permit substantially whole, ruptured juice sacs to pass therethrough, while the smaller apertures 31b are considerably smaller to screen or filter juice sacs, undesirable core material, membrane material, and embryonic seeds from the juice passing therethrough. In this manner, juice and juice sacs will be forced through the larger openings 31a at the beginning of the juice extracting cycle without unduly comminuting the juice sacs (as diagrammatically shown in FIG. 1). Later in the juicing cycle, as shown diagrammatically in FIG. 2, juice will be forced through the smaller apertures 31b, along with a much smaller percentage of juice sac material. It is noted that some juice sac material could perhaps be forced through the smaller apertures 31a, but the smaller openings will tend to comminute the juice sac material.

It should further be noted at this point that more than two different aperture sizes may be incorporated in the strainer tube 30. It is, for example, possible to incorporate three or more different aperture sizes in the strainer tube, with the apertures becoming progressively smaller toward the upper end of the strainer tube.

Based on testing, the preferred diameter for the larger apertures or bores (31a) when oranges are being processed is 0.060 inches, although an aperture size as large as 0.125 inches in diameter has been found to be generally satisfactory. Apertures having a size of 0.060 inches have been found to be sufficiently large to permit substantially whole ruptured juice sacs of oranges to pass therethrough, and yet such preferred size is sufficiently small to screen all but an insignificant amount of undesirable membrane or core material and embryonic seeds at the relatively lower fluid pressures occuring in the strainer tube near the beginning of the fruit compression cycle. The smaller apertures 31b preferably have a diameter which is normal for the type of fruit being juiced, such as 0.40 inches for oranges.

It will be seen that the juncture line JL is located so that about one-half of the aperture portion of the strainer tube contains apertures of the larger size. Again, it will be appreciated that the relative proportion of larger apertures to smaller apertures may be varied according to the characteristics of the fruit being handled and the pressure applied by the extractor on the material within the strainer tube.

The operation of the improved juice extractor 10 incorporating a strainer tube 30 having the multiple size apertures 31a and 31b will now be described in connection with FIGS. 1 and 2. At a point in time in the juice extracting cycle prior to that shown in the Drawings, the upper cup assembly 12 descends to where it centralizes the fruit F between the upper and lower cup assemblies, brings the fruit into substantial conformation with the inner surfaces of the fingers 18, 20 of the cup assemblies, and applies sufficient pressure to cause the opposing annular knife blades 26 and 43 to penetrate the rind of the fruit and cut bottons P and P' therefrom. At such time in the extracting sequence, the orifice tube 32 will be withdrawn downwardly below the lower apertures 31a to provide a substantially free space in the perforated portion of the strainer tube that is adjacent the cups and the fruit. Following such point of time and as illustrated in FIG. 1, the upper cup assembly 12 continues downwardly to force the pulpy juice-bearing internal structure of the fruit F downwardly through the knife passage 28 into the strainer tube 30. Also at this point in time, the orifice tube 32 has risen from its original position to a position above the lowermost ones of the apertures 31a to thereby reduce the volume of the space in the perforated portion of the strainer tube. It will be seen that the force exerted on the orange by the interdigitating cup assemblies forces juice through all of the unobstructed apertures 31a and 31b in the strainer tube and exudes juice sacs (FIG. 1) through the larger apertures 31a in the lower end of the strainer tube. Such juice sacs are forced relatively gently through the larger apertures 31a under the influence of the relatively low fluid pressure within the strainer tube at this stage of the extracting sequence so that they are not unduly comminuted.

It will be appreciated from the foregoing description that the juice and fruit materials within the strainer tube 30 are subjected to a minimum of pressure during the initial portion of the extracting cycle, but that with increased interdigitation of the cup assemblies 12 and 14 and elevation of the orifice tube 32 within the strainer tube, the juice-bearing internal structure of the fruit within the strainer tube is subjected to increasingly greater pressure. FIG. 2 illustrates a later point in time in the extracting cycle after maximum interdigitation occurs but before the orifice tube has been fully raised within the strainer tube. All of the internal structure of the orange has thus been forced down into the passage 28 of the knife 24 and into the strainer tube 30. It will be seen that at this point in time the juice-bearing material of the fruit within the strainer tube will be subjected to a relatively high pressure in comparison to the pressure exerted on the material while the large apertures 31a are still open (i.e. unobstructed by the orifice tube) since the volume containing the fruit pulp has been considerably reduced. However, the smaller apertures 31b in the upper end of the tube are small enough to filter out undesirable membrane and embryonic seed material at such relatively high pressures, thus eliminating concern that the juice extracted from the oranges will contain too much of such undesirable material in addition to juice sacs.

Although the best mode contemplated for carrying out the present invention has been herein shown and described, it will be apparent that modification and variation may be made without departing from what is regarded to be the subject matter of the present invention.

What is claimed is:

1. A juice extractor of the type that concurrently compresses a whole citrus fruit between opposed cups having interdigitating fingers, directs juice and juice sacs to an elongate strainer tube having means for cutting a plug from the peel and discharges, while the fruit is being compressed, the juice and juice sacs through apertures in the strainer tube to a collection reservoir by a closely fitted orifice tube moveable toward and away from the cups in said strainer tube, the improvement comprising means in said extractor to effect passage of whole juice sacs through a portion of the apertures in said strainer tube, said means comprises providing one portion of the strainer tube with apertures of a size to allow free passage of whole juice sacs and the remaining, portion with apertures of a size which will cause rupturing of the juice sacs, said orifice tube while moving toward the cups first traverses said one portion of the strainer tube and effects passage of whole juice sacs to the reservoir and thereafter traverses the other portion of the strainer tube to discharge juice and ruptured membranes through the apertures in said remaining portion, said plunger in moving toward the cups progressively compresses the extracted material contained in the strainer tube such that the rate at which the compression increases in said one portion is substantially less than said remaining portion.

* * * * *